Nov. 15, 1955 H. P. LUHN 2,723,849

RECORD TRANSFERRING DEVICE

Filed Sept. 28, 1951 4 Sheets-Sheet 1

Inventor
HANS P LUHN

By

Harry T. Bettiman
Agent

Nov. 15, 1955 H. P. LUHN 2,723,849

RECORD TRANSFERRING DEVICE

Filed Sept. 28, 1951 4 Sheets-Sheet 2

Inventor
HANS P LUHN

Harry T. Bettiman
Agent

Nov. 15, 1955 H. P. LUHN 2,723,849

RECORD TRANSFERRING DEVICE

Filed Sept. 28, 1951 4 Sheets-Sheet 3

Inventor
HANS P LUHN

Harry T Blumans
Agent

RECORD TRANSFERRING DEVICE

Filed Sept. 28, 1951 4 Sheets-Sheet 4

Inventor
HANS P LUHN

Harry T. Bettiman
Agent

United States Patent Office 2,723,849

Patented Nov. 15, 1955

2,723,849

RECORD TRANSFERRING DEVICE

Hans P. Luhn, Armonk, N. Y., assignor to International Business Machines Corporation, New York, N. Y., a corporation of New York Application September 28, 1951, Serial No. 248,858

5 Claims. (Cl. 271—14)

This invention relates to automatic record handling mechanisms, and more particularly to record handling mechanisms of the type in which records are transferred successively past an observer.

Automatic record handling mechanisms facilitate rapid visual inspection of records on which information has previously been recorded and also leave the observer's hands free for listing, accumulating, reproducing, and so forth, all or parts of the record information by writing, operation of a typewriter, key punch, bookkeeping machine, adding machine, or other devices. It is desirable that the machines handle the records in such a way that they are completely visible by the observer while being advanced. This not only facilitates the reading of information, but also permits the recording of information on the full face of the record. It is also desirable that the records be freely accessible for removal by the observer without stopping the record handling mechanism or interfering with the handling of the other records.

A preferred embodiment of the invention may comprise a stationary frame carrying a record hopper at one end adapted to receive a stack of records, and a record stacker at the other end adapted to receive each record after it has been advanced, step by step, across the stationary frame by the forward movement of a carriage mounted for reciprocation between the hopper and the stacker. The reciprocable carriage may include a feed roller and a stacker roller mounted on opposite ends of the carriage and adapted for rotation around their respective axes as the carriage reciprocates. The feed roller may include spaced radial passages terminating in openings at the surface of the roller, and, on forward movement of the carriage, a source of subatmospheric pressure may be applied to the radial passages of the roller as the related openings roll into contact with the surface of the top record in the hopper. As a result, the top record is peeled from the stack of records in the hopper and wrapped around a portion of the circumference of the feed roller. As the carriage approaches its forward position, the subatmospheric pressure is cut off first from the radial passage adjacent the leading edge of the record, then the next passage, and so on, so that the record releases from the feed roller and passes along the top of the frame until it overlies openings in the record bearing surfaces of the frame. When the carriage reaches its forward position, a source of subatmospheric pressure is applied to the openings so that the record is retained on the frame by suction action, while the carriage is returned to a position for feeding another record from the hopper. During the next feeding motion of the carriage, subatmospheric pressure is removed from the openings in the stationary frame and applied to openings in the carriage for advancing the record along the frame. At the same time, subatmospheric pressure is applied to the feed roller for advancing another record from the hopper while the previously fed record is advanced with the carriage to a second position on the frame. The record bearing surfaces of the carriage and frame are coplanar, and the related openings, when connected to the source of subatmospheric pressure, grip the records from the underside so that the top surface of the record is not obstructed by mechanism. Continued reciprocation of the carriage causes records to be fed successively across the stationary frame. When the forward record reaches the stacker roller, it is picked up by the latter and deposited in the stacker. From then on there is a feeding operation, a stacking operation, and a stepping of the records across the stationary frame on each forward movement of the carriage as long as there are records in the hopper.

An object of this invention is to provide an improved record handling mechanism for successively transporting records past a visual examination position while presenting an unobstructed view of one side of the records.

Another object of this invention is to provide an improved record handling mechanism for successively transporting records past a visual examination zone so that any record or records while in this zone may be readily and rapidly removed from the mechanism without slowing down or stopping the mechanism, or without disturbing the preceding or following records.

Another object of this invention is to provide a simple, efficient, and reliable record handling mechanism for feeding relatively thin records.

Another object of this invention is to provide an improved record handling mechanism in which a roller suction device is utilized to reliably feed very thin records by peeling each record successively from a supply stack rather than lifting or sliding each record from the stack.

Another object of this invention is to provide an improved record transfer mechanism in which a record is at all times maintained in its transfer path under the control of suction devices.

Other objects of the invention will be pointed out in the following description and claims and illustrated in the accompanying drawings, which disclose, by way of example, the principle of the invention and the best mode, which has been contemplated, of applying that principle.

Figure 1:
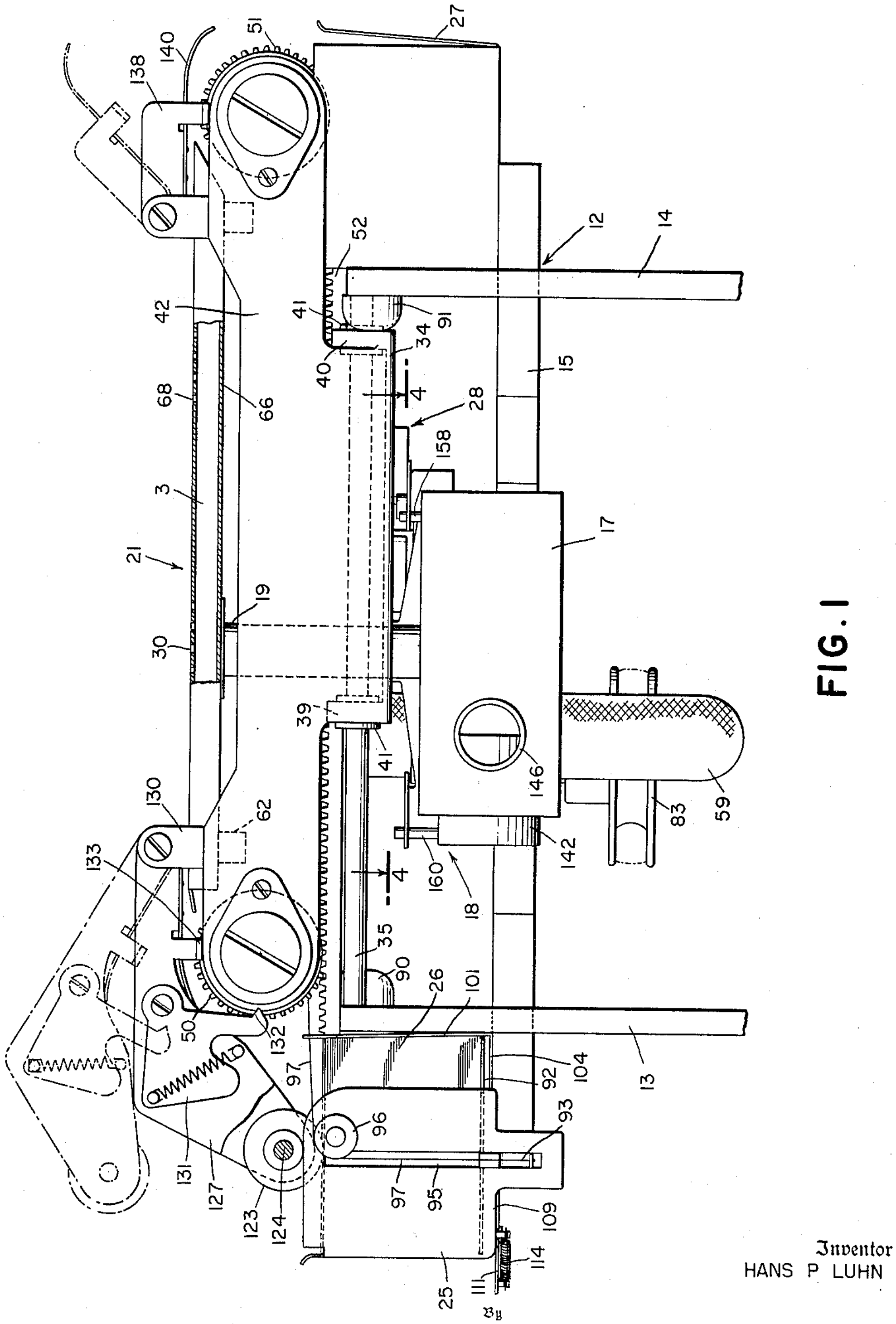
Fig. 1 is a side elevational view of the improved record handling mechanism with the carriage being shown in its extreme forward position.
Figure 2:
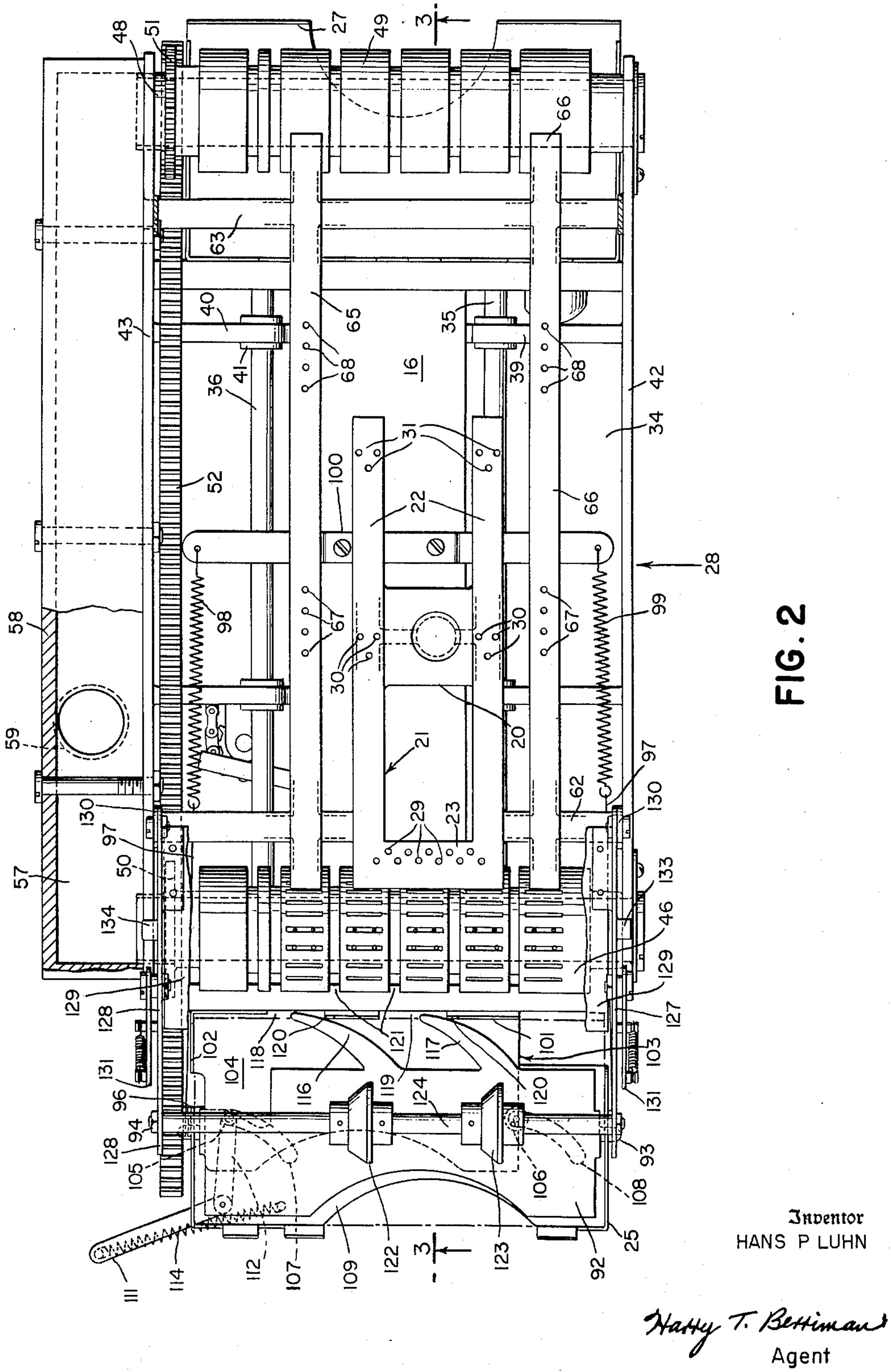
Fig. 2 is a plan view of the improved record handling mechanism.
Figures 3, 6:
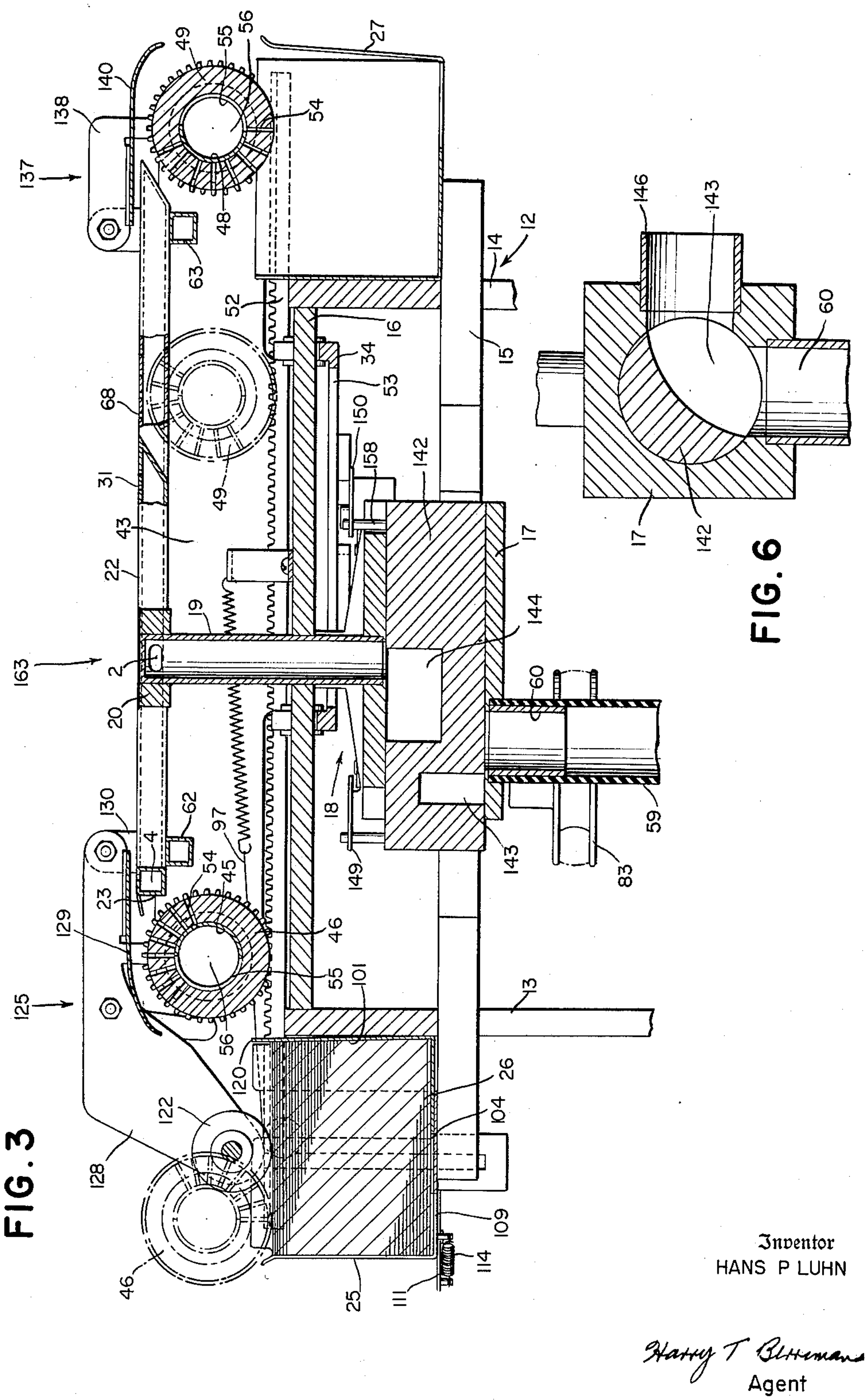
Fig. 3 is a vertical sectional view taken on the plane of the line 3—3 of Fig. 2.
Fig. 6 is a vertical section taken on the line 6—6 of Fig. 4.

The improved record handling mechanism comprises, as shown in Figs. 1 and 3, a stationary frame, generally designated 12, including end plates 13 and 14 rigidly secured to supporting members 15 and 16. Attached to the member 15 at its center is a valve housing 17 of a valve mechanism generally designated 18. Opening into the top of the valve housing is a tubular member 19, and secured to the top of this member is a cross piece 20 of a stationary record supporting frame, generally designated 21. The frame 21 includes, in addition to the cross piece 20, two elongated sections 22 connected at their mid-portions to the ends of the piece 20 and connected at one end by a cross section 23, as shown in Fig. 2. Extending through the cross piece 20 are passages 2 (Fig. 5) opening at their inner ends into the tubular member 19 and communicating at their outer ends with passages 3 in the sections 22. A passage 4

(Fig. 3) in the section 23 also communicates with the passages 3 in the sections 22.

Attached to the end plate 13 is a hopper 25 adapted to receive a stack of records 26, while a stacker 27, attached to the end plate 14, receives the records after they have been advanced, step by step, in a manner to be later explained, across the supporting frame 21 by the forward movement of a carriage 28 which reciprocates between the hopper and the stacker. The sections 22 and 23 of the record supporting frame are provided with groups of openings 29, 30 and 31, as shown in Fig. 2, communicating with the internal passages of the frame. These passages, as described later, are subjected to a subatmospheric pressure by the valve mechanism 18 for holding records on the supporting frame while the carriage is moved toward the feed hopper.

Slidably mounted on guide rods 35 and 36, supported by the end plates 13 and 14 of the stationary frame 12, is the previously mentioned carriage 28 which is adapted to be reciprocated along the guide rods between the hopper and the stacker. The carriage comprises a base plate 34 having integral upwardly extending portions 39 and 40 which carry suitable bearings 41 receiving the guide rods 35 and 36. Also formed integral with the base plate 34 are upwardly extending side flanges 42 and 43. Rotatably mounted on a sleeve 45 supported between the flanges 42 and 43 at the rearward end of the carriage is a so-called feed roller 46. Similarly mounted on a sleeve 48 supported between the flanges 42 and 43 at the forward end of the carriage is a so-called stacker roller 49. Secured to one end of the rollers 46 and 49 are gears 50 and 51 respectively, which mesh a rack 52 secured to the end plates 13 and 14 of the stationary frame. Consequently, as the carriage is reciprocated, the associated rollers 46 and 49, in addition to their horizontal movement with the carriage, are rotated around their respective mounting sleeves. Formed in the plate 34 is an elongated slot 53 (Figs. 3 and 5) through which the tubular member 19 extends so that it does not interfere with reciprocations of the carriage.

Each roller contains, at longitudinally spaced points, groups of radial passages 54 extending through it as shown in Fig. 3. The mounting sleeve of each roller contains a slot 55 so that, as the roller rotates relative to its sleeve, the inner ends of the radial passages communicate successively through the slot 55 with the interior 56 of the sleeve. Secured to the flange 43 of the plate 34, as shown in Fig. 2, is a housing 58 having a chamber 57 with which the sleeves 45 and 48 communicate. The chamber 57 is, in turn, connected by a flexible hose connection 59 to a port 60 of the valve mechanism 18.

The carriage 28 also includes laterally disposed tubular members 62 and 63 extending between the side flanges 42, 43 and communicating with the chamber 57 through openings in the flange 43. Extending transversely to the tubular members 62, 63 and attached to the upper sides of the latter are tubular members 65 and 66, the members 62, 63 communicating with the members 65, 66 through openings at their points of intersection. The interior of the members 65 and 66 also communicate with their top surfaces through spaced groups of openings 67 and 68, as shown in Fig. 2. It will be noted in Figs. 1 and 2 that the members 65 and 66 of the carriage 28 are arranged parallel to the record guide members 21 and 22 of the stationary frame, and the top surfaces of these members are coplanar.

During forward movement of the carriage, the valve mechanism 18 operates to supply subatmospheric pressure to the chamber 57 where it is delivered through the tubular members 62, 63, 65 and 66 of the carriage to the openings 67, 68 and is delivered also through the sleeves 45, 48 and the radial passages 54 to the peripheries of the feed roller 46 and the stacker roller 49. As a result, records are advanced by the rollers and the carriage toward the stacker 27. During movement of the rollers and carriage toward the feed hopper, subatmospheric pressure is supplied by the valve mechanism through the tubular member 19 and the stationary supporting frame 21 to the openings 29, 30, and 31 for holding the records in their advanced positions.

Figures 4, 5:
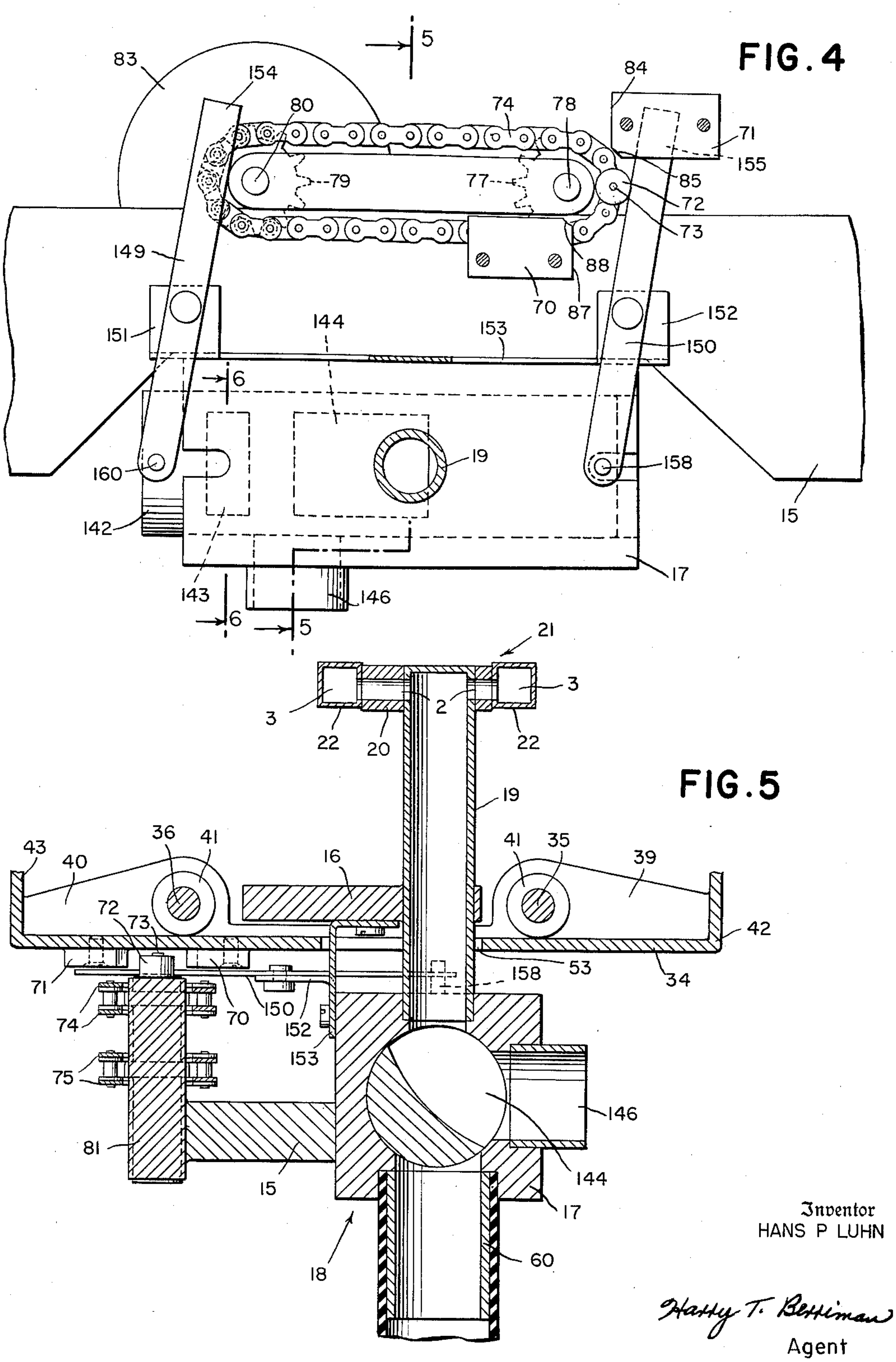
Fig. 4 is a horizontal sectional view taken on the line 4—4 of Fig. 1 and shows the valve mechanism positioned to effect a forward movement of the carriage.
Fig. 5 is a vertical sectional view taken on the line 5—5 of Fig. 4.

To reciprocate the carriage 28, plates 70 and 71 (Figs. 4 and 5) are secured to the underside of the base plate 34 of the carriage in such a position that they are alternately engaged by a roller cam 72 which is carried on the top of a stud 73 linking two rotating chains 74 and 75. Each of the chains mesh a related sprocket 77 secured to an idler shaft 78, and a related sprocket 79 secured to a driven shaft 80, the shafts 78 and 80 being journalled in suitable bearings carried by extending portions of a block 81 which is secured to the cross member 15 of the stationary frame 12. A pulley 83 secured to the bottom end of the shaft 80 is belt driven from a motor (not shown) so that the chains 74 and 75 circulate clockwise in Fig. 4. The stud 73 ties two links of the chains together to insure that the chains rotate as a single unit. As the chains rotate, the roller cam 72 engages the flat surface 84 of the plate 71 and forces the plate and associated carriage to the right or forward into the position shown in Figs. 1, 2 and 3. As the portions of the chains 74 and 75 carrying the stud 72 move into engagement with the sprockets 77, the roller cam engages the curved surface 85 of the plate 71 and then moves out of engagement with the plate so that forward movement of the carriage ceases. Fig. 4 shows the roller cam in this position. As circulation of the chains continue, the roller cam 72 engages the flat surface 87 of the plate 70 and forces the cam plate and associated carriage to the left or rearward in Fig. 4.

Thereafter, as that portion of the chains 74 and 75 carrying the stud 72 move in engagement with the sprockets 79, the roller cam 72 engages the curved surface 88 of the plate 70 and then moves out of contact with the plate so that movement of the carriage to the left or rearward in Fig. 4 ceases. When the carriage is in its extreme rearward position, it is located so as to support the rollers 46 and 49 in the positions in which they are shown by broken lines in Fig. 3. As the carriage possesses some momentum when the roller cam moves out of contact with either the plate 70 or 71 as the case may be, rubber stops 90 and 91 (Fig. 1) secured to the end plates 13 and 14 of the stationary frame serve to limit the travel of the carriage rearward or forward with a minimum of shock.

When the carriage occupies its extreme rearward position, the stacker roller 49 is near the stacker ends of the record guide sections 22 of the stationary supporting frame 21, while the feed roller 46 is positioned over the rearward portions of the stack of records in the hopper. These records are supported on a false bottom 92 (Figs. 1 and 2) which include extending portions 93 and 94 slidably engaging slots 95 in each side of the hopper. Rotatably mounted on the outside of each of the side walls of the hopper is a small pulley 96 adapted to receive a related cord 97 as most clearly shown in Fig. 1. One end of the cord is attached to the related extending portion 93 or 94 of the false bottom while the other end of the cord is attached to one end of a related spring 98 or 99, the other ends of the springs 98 and 99 being attached to opposite ends of a member 100 which is secured to the top of the cross member 16 as shown in Fig. 2. As a result of this construction, the entire stack of records in the hopper is continually urged upward so that the top record in the stack is yieldingly held in contact with the feed roller when the carriage is in its above described rearward position.

In order to accommodate more than one ticket size, the front wall 101 and the one side wall 102 of the hopper comprise portions of a member 103 which can be shifted so as to alter the inside dimensions of the hopper. The member 103 has a base portion 104 carrying studs 105 and 106 which engage slots 107 and 108, respectively, cut in the true bottom 109 of the hopper. With the member 103 in the position shown in Fig. 2, the hopper will accommodate the maximum size record which the mechanism is able to handle. To alter the position of the member 103, there is provided a hand lever 111 pivotally mounted on the true bottom 109 of the hopper and having its end 112 pivotally attached to the stud 105 on the base portion 104 of the member 103. As the lever 111 is rotated clockwise in Fig. 2, the member 103 moves in the direction determined by the slots 107 and 108 until the studs 105 and 106 engage the other ends of the slots. With the member in this latter position, smaller size records may be accommodated by the hopper. A spring 114 connected between the hand lever 111 and the true bottom 109 of the hopper maintains the member 103 in either of its limiting positions. It should be noted in Fig. 2 that the false bottom 92 of the hopper has extending portions 116 and 117 which, in conjunction with the main portion of the false bottom, support the records when the hopper is adjusted so as to receive large size records. When the member 103 is shifted in order to adapt the hopper to smaller size records, the extending portions 116 and 117 of the false bottom engage slots 118 and 119 cut in the front wall 101 of the member 103, and, as a result, smaller size records are supported only on the main portion of the false bottom. At the upper edge of the front wall 101 are projecting portions 120 extending slightly above the plane including the lower points on the feed roller so that the records do not slide out of the hopper when the roller is moved in a forward direction. Formed in the feed roller are annular grooves 121 adapted to receive the portions 120 as the roller is moved relative to the hopper. It will be noted that there are two projecting portions 120, and these cooperate with one pair of grooves 121 when the member 103 is in one of its limiting positions and with another pair of grooves when in its other limiting position.

As the carriage moves forward, to the right in Fig. 3, the top record in the hopper is peeled from the remaining records in the stack, in a manner to be later explained, by the feed roller 46 as it rolls over the top record. When the carriage reaches its extreme forward position, as shown in Fig. 3, the stacker roller 49 is positioned over the stacker 27, while the feed roller 46 is positioned slightly to the right of the hopper and near to the hopper ends of the supporting frame 21. As the feed roller moves towards the right of the hopper during the forward excursion of the carriage, the records in the hopper are yieldingly held against a pair of rollers 122 and 123 mounted on a shaft 124 carried by a frame 125 which is attached to the carriage. The frame 125 comprises two side members 127 and 128 and a cross member 129 formed of a transparent material and attached to and supported between the members 127 and 128 as shown in Figs. 2 and 3. It will be noted in Fig. 3, that the cross member 129 is curved to partially follow the contour of the feed roller 46 of the carriage. On a forward movement of the carriage, the undersurface of the cross member 129 serves to guide the leading edge of the top record in the hopper as it is fed from the hopper by the feed roller in a manner to be later described. The side members 127 and 128 of the frame 125 are pivotally secured to the top ends of upwardly extending portions 130 of the previously mentioned member 62 which, it will be remembered, is supported between the side flanges 42 and 43 of the carriage. Mounted on each of the side members 127 and 128 is a spring urged latch 131, the nose of which is adapted to engage a notch 132 cut in the related side flange of the carriage in order to lock the frame 125 in its operative or full line position as shown in Fig. 1. When access to the hopper is desired, the carriage 33 is stopped in its extreme forward position, and the frame is lifted into the dotted line position shown in Fig. 1. As the frame is returned to its operative position, formed extensions 133 and 134 on each of the side members 127 and 128 abut the related side flange of the carriage to accurately position the frame in its operative position.

Pivotally attached to the stacker end of the carriage in a similar manner, is a frame 137 comprising side members 138 carrying a cross member 140 of a transparent material. It will be noted that the cross member 140 is curved to partially follow the contour of the stacker roller and operates, on forward movement of the carriage, to guide the leading edge of a record as it is fed into the stacker by the roller 49. The frame 137 may also be rotated into a raised position when so desired, as shown in the dotted line form in Fig. 1.

The valve mechanism 18, most clearly shown in Fig. 3, comprises a plunger 142 mounted to reciprocate in the previously mentioned valve housing 17. The plunger 142 has two recesses 143 and 144 as shown in Figs. 3, 5 and 6. When the plunger occupies its extreme left hand position, as shown in Figs. 3 and 5, the tubular member 19 is connected through the recess 144 to the port 146 which is connected to a source of subatmospheric pressure. At this time, the plunger seals the port 60 of the valve mechanism, as shown in Figs. 3 and 5, from the subatmospheric connection 146.

If the plunger 142 is shifted to the extreme right hand position in the valve housing, the vacuum port 146 is cut off from the tubular member 19 and is connected to the port 60 through the recess 143, as shown in Fig. 6. The plunger 142 is reciprocated in a timed relationship with the reciprocation of the carriage 28 relative to the stationary frame 12 so that during the machine interval when the carriage moves rearward, the plunger occupies an extreme left hand position as shown in Fig. 3, while during the machine interval when the carriage moves forward on the stationary frame, the plunger occupies an extreme right hand position.

For operating the plunger 142 in timed relationship with the forward and rearward movement of the carriage 28, there are provided, as shown in Fig. 4, two levers 149 and 150 rotatably mounted on formed extensions 151 and 152, respectively, of a bracket 153, which is secured to the valve housing 17 and cross member 16. The levers 149 and 150 have their one end 154 and 155, respectively, extending into the operational path of the roller cam 72. Consequently, as the roller cam 72 circulates around the sprocket 77 prior to engaging the plate 70 and moving the carriage rearward, it engages the side of the lever 150 and swings the latter counterclockwise. A stud 158 attached to the right end of the plunger 142 pivotally engages a hole in the lever 150 so that as the lever rotates counterclockwise, the plunger moves to its extreme left hand position as shown in Figs. 1, 3, and 4. As a result, the subatmospheric port 146 of the valve mechanism is connected to the tubular member 19 during the later rearward movement of the carriage. Similarly, as the roller cam 72 moves around the sprockets 79 prior to engaging the plate 71 and moving the carriage forward, it engages the lever 149 to rotate it counterclockwise. A stud 160 attached to the left end of the plunger 142 pivotally engages a hole in the lever 149 so that as the lever rotates counterclockwise, the plunger 142 moves from that position shown in Figs. 1, 3, and 4 to an extreme right position in the valve housing. As a result, the connection 146 of the valve mechanism is connected to the port 60 during the later forward movement of the carriage.

The above mechanism operates as hereinafter described to effect a feeding of records one by one from the hopper, a transferring of the records through an observing position, and a depositing of each record in the stacker 27 upon the completion of its movement through the observing position. For convenience of explanation, it is assumed that prior to the energization of the drive motor for the mechanism, the carriage 28 rests in its forward position, and the roller cam 72 on the drive chains is positioned so that it engages the plate 70 on the carriage. It is also assumed that there are records only in the hopper at this time.

Upon the energization of the drive motor, the chains 74 and 75 circulate counterclockwise in Fig. 4 and move the carriage rearwardly. As the portion of the chains 74 and 75 carrying the roller cam 72 start around the sprockets 79, the roller cam 72 moves out of contact with the plate 70 so that rearward movement of the carriage ceases. The carriage then occupies its extreme rearward position with the rollers 46 and 49 located as shown by broken lines in Fig. 3. It will be noted that with the carriage in this position, the feed roller is so positioned over the hopper 25 that the extreme clockwise passages 54 of the feed roller have their openings on the surface of the roller engaged by the topmost record in the hopper, while the inner openings of the extreme clockwise passages are opposite the slot 55 in the mounting sleeve 45 and, consequently, communicating with the interior 56 of the latter. The other passages 54 in the feed roller are prevented from communicating with the space 56 by the solid portion of the mounting sleeve 45.

As the roller cam 72 continues its movement around the sprockets 79, it engages the lever 149 of the valve mechanism and swings the latter counterclockwise in Fig. 4 to move the valve plunger 142 to its right hand position. As a result, a subatmospheric pressure is applied from the connection 146 through the conduit 59, the chamber 57 and the sleeve 45 to the extreme clockwise passages 54 of the feed roller, and the top ticket is gripped by the suction action on the surface of the feed roller. Since the axial passage of the stacker roller 49 and the passageways of the guide members 65 and 66 of the carriage also communicate with the chamber 57, they are also subjected to a subatmospheric pressure at this time, but this is of no consequence during the first record feed movement of the carriage as hereinafter explained.

As the chains 74 and 75 and the associated roller cam 72 continue their clockwise movement in Fig. 4, the roller cam engages the plate 71 of the carriage and moves it forward. The feed roller 46, in addition to moving forward with the carriage, rotates clockwise from its broken line position shown in Fig. 3. As the feed roller rotates, the inner ends of the passages 54 communicate successively with the slot 55 in the sleeve 45 while the outer ends of the passages roll into engagement with the top record in the hopper. As a result, increasing amounts of the top record are wrapped around and carried with the roller as it rotates clockwise and moves forward with the carriage. By this action, the top record in the hopper is in effect peeled from the remaining records and, as a result, the possibility of erroneous feeding of two or more records at a time is minimized. The ticket peeled from the hopper is carried with the roller between the latter and the curved under surface of the cross member 129 on the frame 125, the member 129 serving to guide the leading edge of the record. When the passages 54 reach vertical positions at the upper side of the sleeve 45, they are cut off from communication with the slot 55 so that the record is permitted to move away from the roller and overlie the sections 22 of the stationary frame 21 as well as the guide members 65, 66 of the carriage. As the portion of the chains 74 and 75 carrying the roller cam 72 start around the sprockets 77, the roller cam engages the curved surface of the plate 71 and then moves out of contact with the plate so that forward movement of the carriage ceases. At this time, the leading portion of the record is positioned on the coplanar top surfaces of the stationary frame and carriage and overlies the openings 29 in the guide section 23 of the stationary frame.

As the roller cam 72 continues its movement around the sprockets 77, it engages the lever 150 of the valve mechanism and actuates it for moving the plunger of the valve mechanism to the position shown in Fig. 4. With the valve plunger in this position, the vacuum connection to the feed roller 46, the stacker roller 49, and guide members 65 and 66 of the carriage is severed and a subatmospheric pressure is applied to the passageways of the guide sections 22 and 23 of the stationary frame. As a result, a suction action is applied at the openings 29 in the guide section 23 of the frame for gripping the record thereon, and the suction is removed from the feed roller to release the trailing edge of the record. The suction is applied to the openings 29 in the guide section 23 of the frame as follows: From the vacuum connection 146 through the recess 144 in the valve plunger 142 to the tubular member 19 where it is applied through passages 2, 3 (Fig. 5) and passage 4 (Fig. 3) to the openings 29.

As the chains 74, 75 and the roller cam 72 continue their clockwise movement, the roller cam 72 engages the plate 87 on the carriage and shifts the carriage rearward in the same manner as previously explained. During rearward movement of the carriage, however, the previously fed record is held to the stationary frame 21 by the suction action at the openings 29. When the carriage reaches its extreme rearward position, the openings 67 in the guide members 65 and 66 of the carriage will be laterally aligned with the openings 29.

Shortly after the carriage 12 reaches its extreme rearward position, the valve plunger 142 is again transferred to its right hand position, and, as a result, the vacuum connection to the passages in the stationary frame is severed while a subatmospheric pressure is again applied to the feed roller 46, the stacker roller 49, and the passages in the members 65 and 66 of the carriage. The resultant suction action at the openings 67 in the guide members of the carriage then grips the previously fed record while it is released at the openings 29 in the stationary frame. When the carriage is moved forward again, the feed roller 46 feeds the top record from the hopper in the same manner as previously explained, while the previously fed record is carried forward with the carriage until it lies over the openings 30 in the stationary frame. On the next reciprocation of the carriage, the first record is advanced from the openings 30 to the openings 31 in the stationary frame by suction applied to the openings 68 in the carriage. The second record is advanced at the same time from the openings 29 to the openings 30, and a third record is fed from the hopper to the openings 29. The leading edge of the first record overhangs the stacker ends of the sections 22 of the stationary frame so that the stacker roller 49 comes under the record when the carriage is moved again to its left hand position. On the next feeding movement of the carriage, the stacker roller grips the first record and moves it under the member 140 of the frame 137 to the stacker 27. When the stacker roller starts moving to the right, is passages 54 come successively into communication with the slot 55 for applying suction to the record. As the record moves into the stacker, the passages 54 are cut off successively from the slot 55 to effect a releasing of the record.

On each forward movement of the carriage, thereafter, a record is fed from the hopper to the stationary frame, a record is removed from the stacker end to the frame and deposited in the stacker 27, while other previously fed records on the frame are advanced one record position. This action will continue as long as the carriage continues to oscillate and a supply of records is available in the hopper.

It will be appreciated that during movement of records from the hopper to the stacker, the top surfaces of the records are free of visual obstruction, yet they are at all times positively maintained on either the stationary frame or the carriage as the case may be. It will also be appreciated that during the time when a record is in any observing position, it may be readily removed by hand from the stationary frame or carriage, as the case may be, without disturbing the following or preceding records and without slowing down or stopping the record handling operations of the mechanism.

While there have been shown and described and pointed out the fundamental novel features of the invention as applied to a preferred embodiment, it will be understood that various omissions and substitutions and changes in the form and details of the apparatus illustrated and its operation may be made by those skilled in the art, without departing from the spirit of the invention. It is the intention, therefore, to be limited only as indicated by the scope of the following claims.

What is claimed is:

1. A record transferring device comprising, in combination, a stationary frame having a record supporting surface, first passage means in said frame opening through said surface at longitudinally spaced points, a carriage having a record supporting surface lying in a common plane with the supporting surface of said stationary frame, a roller mounted upon said carriage at one end of the latter and having points in its periphery lying closely adjacent said common plane, a hopper attached to said stationary frame for receiving records to be transferred, means for reciprocating said carriage so that said roller moves between a rearward position overlying said hopper and a forward position adjacent one end of the supporting surface on said stationary frame, means for rotating said roller during reciprocations of said carriage, second passage means opening through the supporting surface on said carriage at longitudinally spaced points and opening through the periphery of said roller at angularly spaced points, and means for subjecting said second passage means to a subatmospheric pressure during a forward movement of said carriage wherein the top record in said hopper is gripped by said roller for advancement therewith and wherein any records on said stationary frame are gripped by said carriage for advancement therewith, and means for subjecting said first passage means to a subatmospheric pressure during a rearward movement of said carriage, wherein the record gripped by said roller during said forward movement is released therefrom and gripped by said frame, and wherein any record gripped by said carriage during said forward movement and adjacent the record supporting surfaces of said frame at the beginning of said rearward movement are released therefrom and gripped by said frame.

2. A record transferring device comprising, in combination, a stationary frame having a record supporting surface, first passage means in said frame opening through said surface at longitudinally spaced points, a carriage having a record supporting surface lying in a common plane with the supporting surface of said stationary frame, a roller mounted upon said carriage at one end of the latter and having points in its periphery lying closely adjacent said common plane, said roller including spaced annular grooves in the periphery thereof, a hopper attached to said stationary frame for receiving records to be transferred, means for reciprocating said carriage so that said roller moves between a rearward position overlying said hopper and a forward position adjacent said stationary frame, projecting portions on the forward wall of said hopper extending into said annular grooves in said roller for preventing a sliding of records from said hopper by said roller, means for rotating said roller during reciprocations of said carriage, second passage means opening through the supporting surface on said carriage at longitudinally spaced points and opening through the periphery of said roller at angularly spaced points, and means for subjecting said second passage means to a subatmospheric pressure during a forward movement of said carriage wherein the top record in said hopper is gripped by said roller for advancement therewith and wherein any records on said stationary frame are gripped by said carriage for advancement therewith, and means for subjecting said first passage means to a subatmospheric pressure during a rearward movement of said carriage, wherein the record gripped by said roller during said forward movement is released therefrom and gripped by said frame, and wherein any record gripped by said carriage during said forward movement and adjacent the record supporting surfaces of said frame at the beginning of said rearward movement are released therefrom and gripped by said frame.

3. A record transferring device comprising, in combination, a stationary frame having a record supporting surface, passage means in said frame opening through said surface at longitudinally spaced points, a carriage slidably mounted on said frame and having a record supporting surface lying in a common plane with the supporting surface of said stationary frame, a member secured to said carriage and including an air-tight chamber, a hollow sleeve secured to said carriage and communicating with said chamber, said sleeve including a longitudinally extending slot, a roller mounted upon said sleeve and having points in its periphery lying closely adjacent said common plane, said roller having angularly spaced radial passages extending through it at longitudinally spaced points, a hopper attached to said stationary frame for receiving records to be transferred, said hopper including a movable bottom, means for reciprocating said carriage on said frame so that said roller moves between a rearward position overlying said hopper and a forward position adjacent one end of the supporting surface of said stationary frame, means acting on said movable bottom of the hopper to yieldingly maintain the top record of the record stack supported thereon in engagement with said roller when overlying said hopper, a member attached to said carriage and extending rearwardly beyond said roller, said member being movable over said hopper for preventing ejection of records from said hopper when the roller is in its forward position, means for rotating said roller during reciprocation of said carriage, second passage means opening through the supporting surface of said carriage at longitudinally spaced points and communicating with said chamber, and means for subjecting said chamber to a subatmospheric pressure on a forward movement of said carriage, and subjecting said first passage means to a subatmospheric pressure on a rearward movement of said carriage.

4. A record transferring device comprising, in combination, a stationary frame having a record supporting surface, first passage means in said frame opening through said surface at longitudinally spaced points, a carriage having a record supporting surface lying in a common plane with the supporting surface of said stationary frame, a first roller mounted upon said carriage at one end of the latter and having points in its periphery lying closely adjacent said common plane, a second roller mounted upon the other end of said carriage and having points in its periphery lying closely adjacent said common plane, a hopper attached to one end of said stationary frame for receiving records to be transferred, a stacker attached to the other end of said stationary frame for receiving records after they have been transferred across said stationary frame, means for reciprocating said carriage between a rearward and forward position so that said first roller moves between a rearward position overlying said hopper and a forward position adjacent one end of the supporting surface of said stationary frame, and so that said second roller moves between a rearward position adjacent the other end of said supporting surface of said stationary frame and a forward position overlying said stacker, means for rotating said rollers during reciprocations of said carriage, second passage means opening through the supporting surface on said carriage at longitudinally spaced points, and opening through the periphery of said rollers at angularly spaced points, and means for subjecting said second passage means to a subatmospheric pressure during a forward movement of said carriage wherein the top record in said hopper is gripped by said first roller for advancement therewith, and wherein a record on said stationary frame in a position adjacent said stacker is gripped by said second roller for advancement therewith, and wherein any other records on said frame in positions other than said position adjacent said stacker are gripped by said carriage for advancement therewith, and means for subjecting said first passage means to a subatmospheric pressure during a rearward movement of said carriage, wherein the record gripped by said first roller during the forward movement is released therefrom and gripped by said frame, the record gripped by said second roller during said forward movement is released therefrom and deposited in said stacker, and wherein any records gripped by said carriage during said forward movement thereof are released therefrom and gripped by said frame.

5. A record transferring device comprising, in combination, a stationary frame having a record supporting surface, first passage means in said frame opening through said surface at longitudinally spaced points, a carriage having a record supporting surface lying in a common plane with the supporting surface of said stationary frame, a first roller mounted upon said carriage at one end of the latter and having points in its periphery lying closely adjacent said common plane, a second roller mounted upon the other end of said carriage and having points in its periphery lying closely adjacent said common plane, a hopper attached to one end of said stationary frame for receiving records to be transferred, said hopper including a movable bottom, a stacker attached to the other end of said stationary frame for receiving records after they have been transferred across said stationary frame, means for reciprocating said carriage between a rearward and forward position so that said first roller moves between a rearward position overlying said hopper and a forward position adjacent one end of the supporting surface of said stationary frame, and so that said second roller moves between a rearward position adjacent the other end of said supporting surface of said stationary frame and a forward position overlying said stacker, means acting on said movable bottom of the hopper to yieldingly maintain the top record of the record stack supported thereon in engagement with said first roller when overlying said hopper, a record guide member attached to said carriage and partially surrounding said first roller, said guide member including a rearwardly extending member movable over said hopper for preventing ejection of records therefrom when said first roller is positioned in said forward position, a record guide member attached to said carriage and partially surrounding said second roller, means for rotating said rollers during reciprocation of said carriage, second passage means opening through the supporting surface on said carriage at longitudinally spaced points and opening through the periphery of said rollers at angularly spaced points, a valve mechanism operable in a first position to subject said first passage means to a subatmospheric pressure, and operable in a second position to subject said second passage means to a subatmospheric pressure, means connected to said carriage reciprocating means and operating at the end of the rearward movement of said carriage for switching said valve mechanism to said second position wherein during the subsequent forward movement of said carriage said top record in the hopper is gripped by said first roller for advancement therewith, a record on said stationary frame in a position adjacent said stacker is gripped by said second roller for advancement therewith, and wherein any other records on said frame in positions other than said position adjacent said stacker are gripped by said carriage for advancement therewith, and means connected to said carriage reciprocating means and operating at the end of the forward movement of said carriage for switching said valve mechanism to said first position wherein the record gripped by said first roller is released therefrom and gripped by said frame, the record gripped by said second roller is released therefrom and deposited in said stacker, and wherein any records gripped by said carriage are released therefrom and gripped by said frame.

References Cited in the file of this patent

UNITED STATES PATENTS

| | | |
|---|---|---|
| 1,838,200 | Tomtlund | Dec. 29, 1931 |
| 1,873,316 | Droitcour | Aug. 23, 1932 |
| 2,063,486 | Carroll | Dec. 8, 1936 |
| 2,114,593 | Donnellan | Apr. 19, 1938 |
| 2,578,779 | Black | Dec. 18, 1951 |